United States Patent [19]

Ball

[11] 3,779,354
[45] Dec. 18, 1973

[54] PROTECTIVE OVERSPEED TORQUE COUPLING

[75] Inventor: Rowland E. Ball, Long Beach, Calif.

[73] Assignee: Borg-Warner Corporation, Chicago, Ill.

[22] Filed: Nov. 10, 1971

[21] Appl. No.: 197,250

[52] U.S. Cl. ............... 192/104 R, 64/9, 192/103 R
[51] Int. Cl. .......................................... F16d 43/24
[58] Field of Search ............... 192/104 R, 103 R; 64/9

[56] References Cited
UNITED STATES PATENTS

| 3,306,406 | 2/1967 | Poliseo | 192/104 R |
| 2,939,562 | 6/1960 | Miller | 192/104 R |
| 3,459,430 | 8/1969 | Ball | 277/3 |

FOREIGN PATENTS OR APPLICATIONS

| 619,540 | 3/1949 | Great Britain | 192/104 R |

Primary Examiner—Charles J. Myhre
Assistant Examiner—Randall Heald
Attorney—Donald W. Banner et al.

[57] ABSTRACT

A rotatable coupling adapted to transmit torque between a driving unit and a driven unit such as a centrifugal pump including a first member adapted to rotate with a second member, a linkage mechanism such as meshing gears or dogs normally locking the first member from rotation with respect to the second member and a release mechanism responsive to rotational speed of the coupling which will release the linkage mechanism at a predetermined rotational speed over normal speed and permit free rotation of the first member with respect to the second member.

7 Claims, 7 Drawing Figures

INVENTOR
ROWLAND E. BALL

INVENTOR
ROWLAND E. BALL
BY John O. Evans, Jr.
James W. Copper

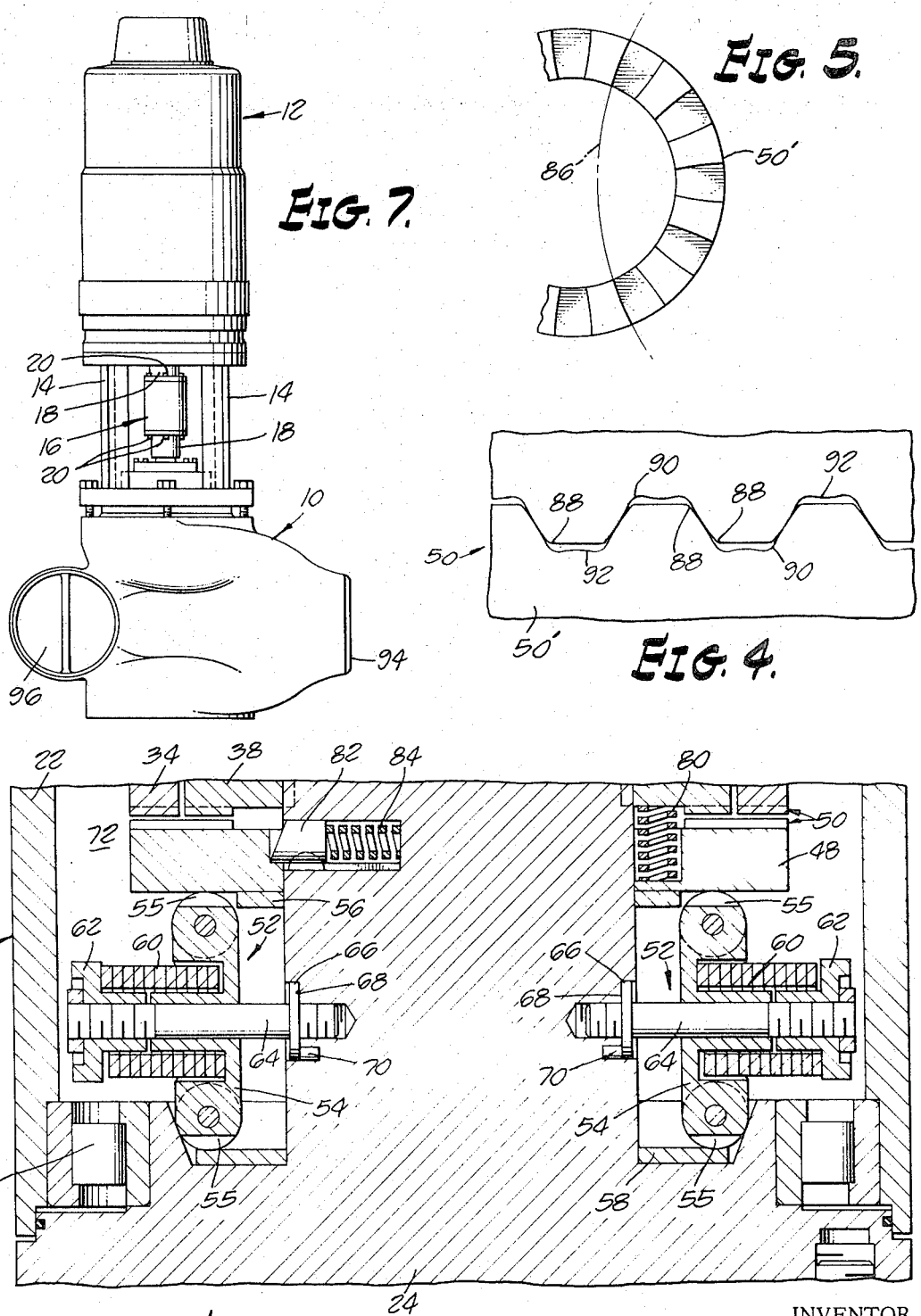

PROTECTIVE OVERSPEED TORQUE COUPLING

BACKGROUND OF THE INVENTION

This invention generally relates to rotary couplings and more particularly to a rotary overspeed disconnect safety coupling suitable for coupling a motor to a centrifugal pump, for example. In installations where very large pumps are utilized, such as in eletrical power plants, a disruption in the piping or valving in either the discharge or suction of the pump may cause liquid to be forced through the pump in large quantities. The impeller of the pumps thereon functions as a turbine wheel, tending to drive the motor. Under such conditions the motor may be rotated at much greater speed than for which it was designed. Such overspeed can destroy or severely damage the motor, creating substantial repair expense and loss of pumping time for the pump.

SUMMARY OF THE INVENTION

An object of the invention is to provide a rotary overspeed disconnect coupling between a driving member and a driven member.

Another object of the invention is to provide a rotary overspeed safety coupling which must be recoupled by an operator after disconnection.

A further object of the invention is to provide a rotary overspeed disconnect coupling which may be repeatedly disconnected and reconnected with all components being reusable.

The foregoing and other objects and advantages are attained in a torque transmitting rotary overspeed disconnect safety coupling having a first rotatable member adapted for connection with a driving member, a second rotatable member adapted for connection with a driven member and releasably connected in torque transmitting relation to said first member, and means responsive to rotation of said first member and said second member to disconnect said first member from said second member when said members exceed a preselected rotational speed.

BRIEF DESCRIPTION OF THE DRAWINGS

FIG. 4 is a fragmentary elevational view taken along the line 4—4 of FIG. 1;

FIG. 5 is a fragmentary plan view of the gear teeth on one of the members shown in FIG. 4;

FIG. 6 is a partial view of the structure shown in FIG. 1 and showing the coupling disconnected from torque transmission;

FIG. 7 is an elevational view of a pump motor unit incorporating a rotary overspeed disconnect coupling in accord-ance with the invention.

DESCRIPTION OF THE PREFERRED EMBODIMENT

Figure 1:
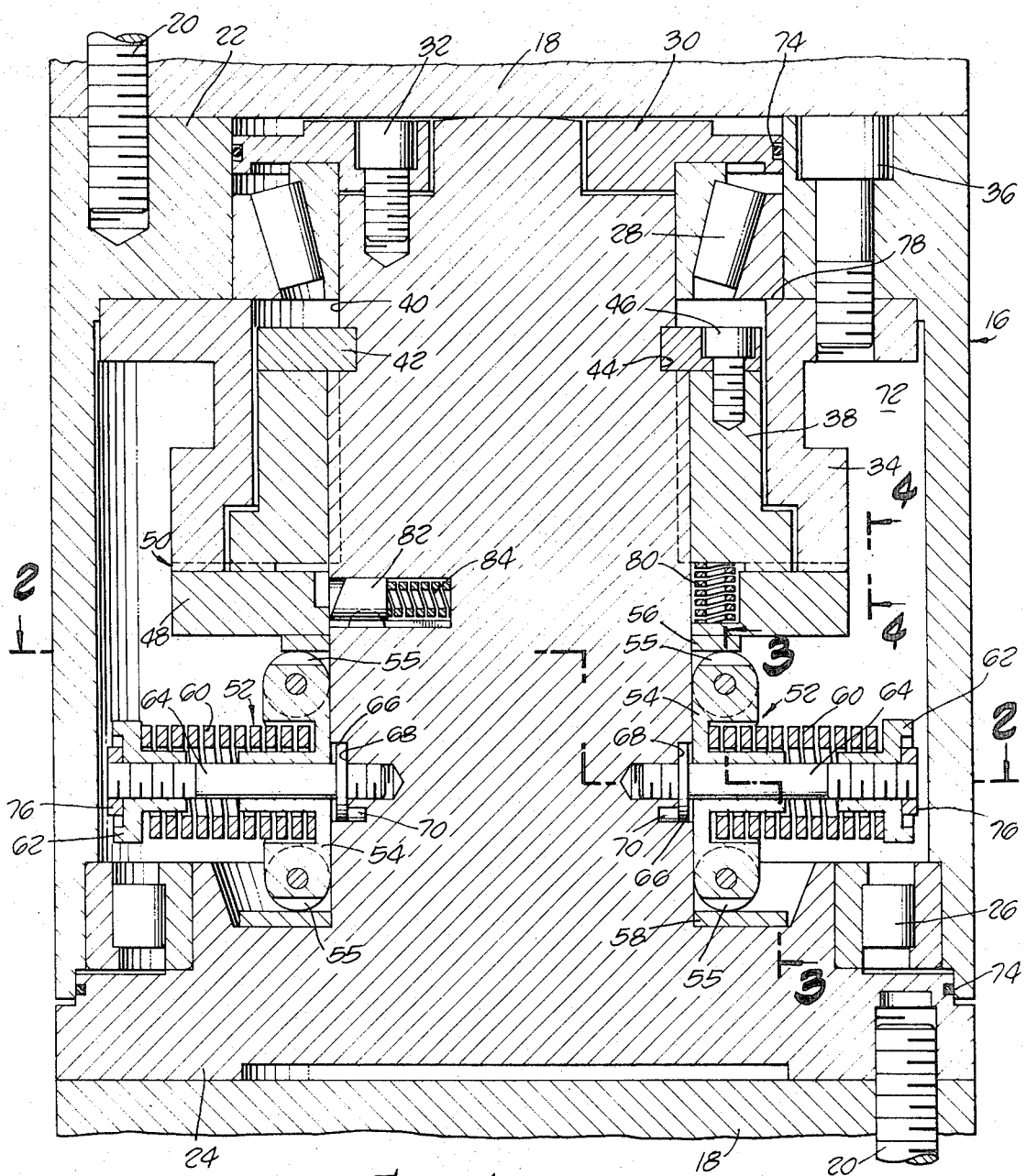
FIG. 1 is an axial sectional view of a preferred embodiment of the rotary overspeed disconnect coupling when connected for torque transmission in accordance with the invention.

Referring first to FIG. 7, the pump-motor unit shown has a pump 10 and an electric motor 12 supported on the pump by a pair of struts 14. A coupling 16 provided in accordance with the invention connects the shaft of motor 12 in torque transmitting relation to the impeller shaft of pump 10 through drive coupling flanges 18. Coupling flanges 18 are respectively keyed or otherwise attached in torque transmitting relation to the respective shafts and are connected to coupling 16 by fasteners such as cap screws 20, for example.

The electric motor 12 is merely illustrative, as is the pump 10. However, the pump as shown is a double-volute, double suction pump having an intake or suction opening 94 and a discharge opening 96. Of note is that various respective couplings 16 may be provided to transmit power from motors to pumps of varied and substantial size. Motor sizes may range from 1,000 h.p. to 7,000 h.p. at 1,750 RPM, for example. Under conditions where liquid forced through pump 10 causes rotation of the pump impeller and the rotor of motor 12, coupling 16 ordinarily may be provided to withstand at least twice the torque producible by motor 12. Also, coupling 16 may be provided to disengage the pump impeller from the rotor of motor 12 at a predetermined overspeed, 2,500 RPM, for example.

Coupling 16 is shown in more detail in FIGS. 1–5.

Figure 2:
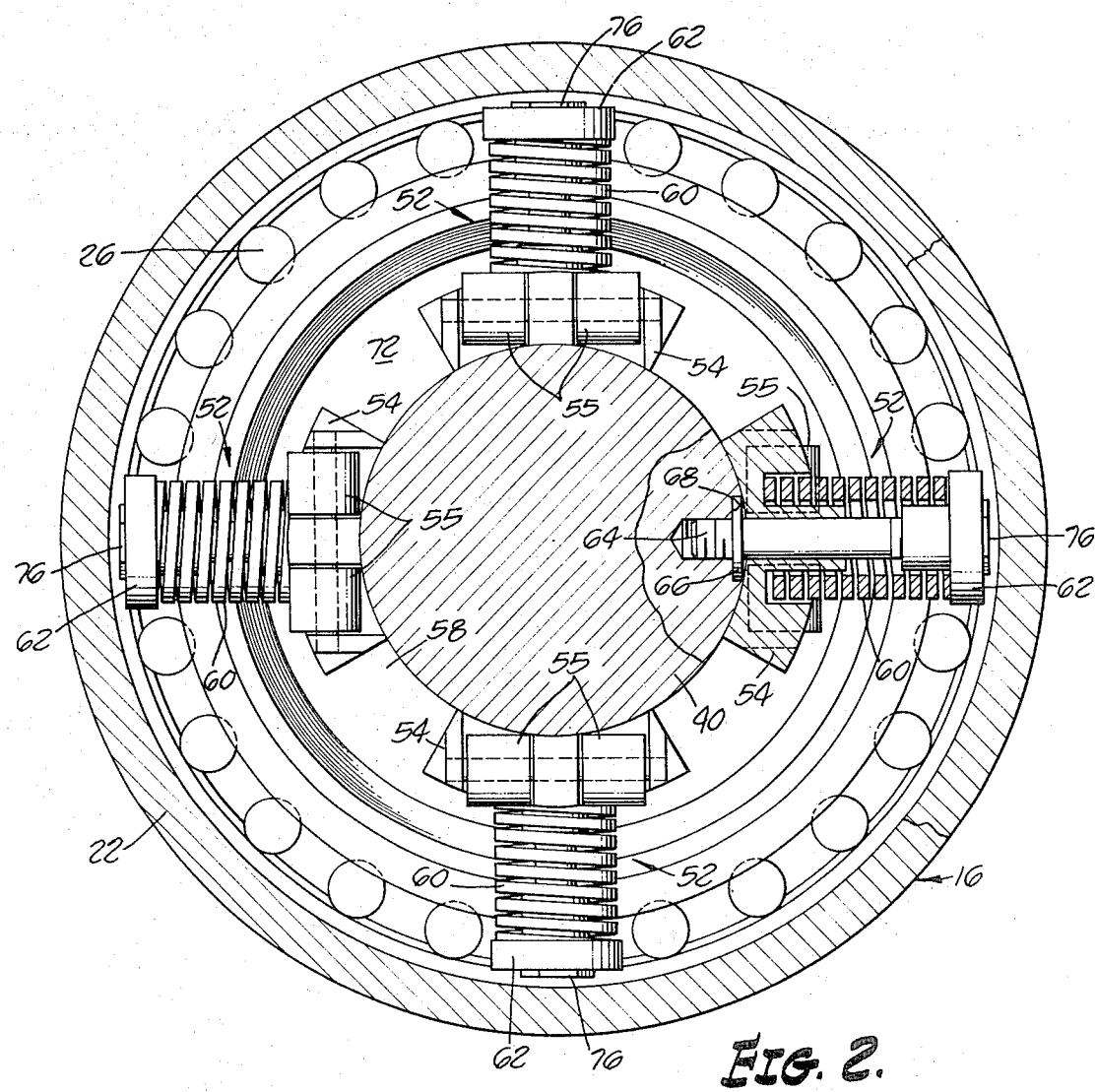
FIG. 2 is a transverse sectional view taken along the line 2—2 of FIG. 1.
Figure 3:
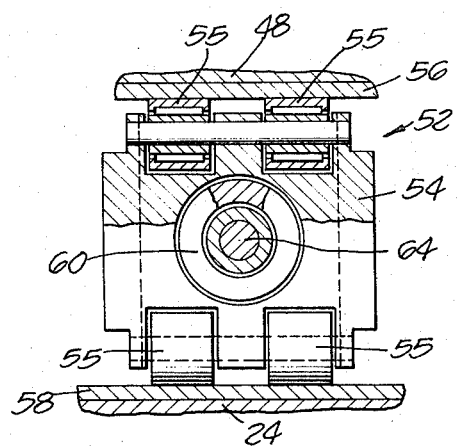
FIG. 3 is a partly sectional and partly elevational view taken along the line 3—3 of FIG. 1.

Turning now to FIGS. 1, 2 and 6, coupling member 16 is seen to comprise a torque driving body 22 connected through cap screws 20 and upper coupling flange 18 to the rotor of motor 12 and a torque driven member 24 connected through cap screws 20 and a lower coupling flange 18 to the impeller of pump 10. At such time as fluids passing through pump 10 may cause rotation of its impeller, the driven member 24 will become the driving member and driving member 22 will become the driven member. For the purpose of this description, the member 22 will be designated the driving member and member 24 designated the driven member, though the roles of such members will be reversed under conditions requiring the employment of disconnect coupling 16.

As shown, driven member 24 is supported in rotatable relation within driving member 22 by means of a lower radial support bearing 26 and an upper combination radial and thrust support bearing 28. The purpose of the thrust fuction of bearing 28 is to rotatably support the rotor of motor 10 at such time as the weight of the rotor may be imposed on coupling 16. Lower bearing 26 is retained in position, as shown by assembly of members 22 and 24. Upper bearing 28 is retained in position as shown by means of a retainer plate 30 which is connected with driven member 24 by a plurality of cap screws 32.

Torque transfer between members 22 and 24 is accomplished by several members as now described including a driving sleeve 34 connected as shown within driving member 22 by means of a plurality of cap screws 36. A driven sleeve 38 is connected in splined relation around the cylindrical shank portion 40 of driven member 24 and retained in position by a split ring 42 disposed in a circumferential slot 44 defined in shank 40 and attached to sleeve 38 by means of cap screws 46. As can readily be seen, the assembly of driven sleeve 38, cap screws 46 and divided ring 42 serves to retain the divided ring in slot 44. A torque transfer ring 48 is disposed about shank 40 and in abutment with the lower ends of sleeves 34 and 38. A meshing gear teeth arrangement 50 is provided on the lower annular faces of sleeves 34 and 38 and the upper face of transfer ring 48. Gear teeth arrangement 50 is later described with reference to FIGS. 4 and 5. Torque transfer ring 48 is removably maintained in abutting torque transfer relation with sleeves 34 and 38 by means of a plurality of rotational speed (RPM) responsive movable support units 52 connected about the circumference of shank 40 as shown.

Each support unit 52 (FIGS. 1–3 and 6) includes a radially movable support block 54 each block mounting a plurality of support bearings 55. The upper support bearings abut a hardened or toughened support plate structure 56 which may be attached to or form a part of the lower face of transfer ring 48. The lower support bearings abut a hardened or toughened support plate 58 which is mounted with or forms a part of driven member 24 as shown.

Support units 52 are each comprised of a support block 54, an adjustable spring 60, and an adjustable retaining nut 62 which is threaded onto a threaded and shouldered mounting shaft 64. Shaft 64 is threaded into shank 40 as shown until its shoulder 66 is in abutment within a counterbore 68 formed in shank 40. Shaft 64 is locked from inadvertent removal by a dowell pin 70 which is driven into registered holes formed in shoulder 66 and shank 40.

Oil or other suitable lubricant for bearings 26 and 28 is provided to fill the cavity 72 defined between members 22 and 24. Rotatable seals 74, for example O-rings, are mounted in retainer plate 30 and driving member 22 as shown to retain such lubricant in cavity 72.

It is to be noted that driving member 22 is axially supported in relation to driven member 24 to form a unitary coupling 16 by means of retainer plate 30 acting through bearing 28 and an abutting portion 78 of sleeve 34 as shown.

When abutting support of transfer ring 48 to hold gear teeth arrangement 50 into meshing relation is removed by radial movement of bearings 55, a plurality of compression springs 80, which are circumferentially mounted around and within transfer ring 48, positively disengage ring 48 from driving sleeve 34 and driven sleeve 38.

A keyed latch button 82 is radially mounted in shank 40 in splined and movable relation responsive to a compression spring 84 to extend out and retain transfer ring 48 in disengaged position after radial extension of support block 54 and expansion of spring 80 (shown in FIG. 6). Button 82 is beveled on its outer face as shown to permit transfer ring 48 to be pushed over button 82 during assembly of coupling 16.

As shown in FIGS. 4 and 6, the teeth of gear teeth arrangement 50 are developed in generally radial disposition in the annular faces of members 34, 38 and 48. The development of these teeth must be appropriate to provide meshing with the shaft sections in alignment. The preferred tooth profile and configuration is later described but other tooth profiles, such as rectangular or triangular, may be provided with some measure of success, depending on the size of the coupling 16, the rotational speed of the coupling and the amount of lateral and torque loading on the shaft.

Coupling arrangements or connections, such as shown in FIGS. 1, 4 and 5, are referred to herein also as a "curvate" coupling 50. Such curvate couplings have been well developed to meet the need for couplings requiring extreme accuracy and maximum load capacity. The curvate design provides an accurate, light, compact, and self-contained connection in which the teeth both serve to center and drive, as compared to other designs where the teeth drive only, and other means of centering are necessary. The curvate coupling 50 has curved radial teeth of constant depth, which are cut and ground into the annular face of each of members 34, 38 and 48. These teeth may be produced with a wide range of pressure angles and chamfered engaging surfaces. The curvate teeth arrangement of coupling 50 is a precision face spline for joining members 34, 38 and 48 to form a single operating unit. This coupling has the advantages of accurate alignment, precision centering and positive drive.

The curvature of the curvate teeth, such as teeth 50' (See FIGS. 4 and 5) exists because the members are ground with a cup-type grinding wheel (not shown). One member may be made with the outside edge 86 of a wheel, as shown in FIG. 5, to form a concave or hour-glass-shaped tooth. The mating members (not shown) may be made with the inside edge of the wheel (not shown), thus producing a convex or barrel-shaped tooth. The radius of the cutting surface is selected to give the desired length of tooth contact.

In contrast with other types of couplings, the curvate coupling 50 has teeth spaced continuously about the entire circumference, each tooth tapering toward the center. Any attempt therefore to move one tooth out of position is resisted by all the other teeth in the coupling. The controlled matching of the curved teeth in such a coupling is also an important factor in resisting relative movement between members 34, 38 and 48, and in centering said members.

This centering action is of substantial importance in maintaining the balance of the coupling 16, particularly when provided of large size. Much of the success of such a curvate coupling design resides in the ability of the composite assembly to remain in balance under continuous operation. Furthermore, the coupling 16 can be disassembled and then reassembled with the same teeth mating without disturbing the original accuracy and balance.

An enlarged view of the ground curvate coupling teeth at the outside diameter is shown in FIG. 4. A chamfer 88 on the top of the teeth is automatically ground as the tooth slot is being ground. This permits a larger fillet radius 90 to be used, thus stengthening the teeth. Also shown is a characteristic gable bottom 92 which eliminates any possibility of forming a stress-raising step in the root of the tooth.

Supplemental specific information concerning couplings such as described is available from the Gleason Works, 1000 University Avenue, Rochester, N.Y. 14603, U.S.A.

OPERATION OF THE INVENTION

Referring now to FIGS. 1, 6 and 7, the coupling 16 is assembled as shown in FIG. 1 with the cavity 72 filled with an appropriate lubricant and the coupling is mounted with flanges 18 into an operating position such as shown in FIG. 7.

During assembly the adjustable retaining nuts 62 of support unit 52 are varied along the shafts 61 to appropriately adjust the compression of springs 60 to permit the mass of the support blocks 54 and rollers 55 to pull the support blocks 54 from supporting relation of torque transfer ring 48 responsive to the centrifugal force generated at a preselected RPM of the coupling 16. Such adjustment may be made through trial but predetermined calibration of springs 60, nuts 62 and shafts 64 is preferably utilized.

At any time that coupling 16 is rotated above a predetermined speed, the blocks 54 are forced out of supporting relation with torque transfer ring 48 by centrifugal force. FIG. 6 best illustrates the position of blocks 54 when transfer ring 48 is no longer supported in torque transferring meshed relation with sleeves 34 and 38.

At such times as the support of blocks 54 is removed, springs 80 immediately force ring 48 from meshed relation with sleeves and detent button 82 is moved out by spring 84 to latch ring 48 and prevent its return into meshed position. Such action is also shown best in FIG. 6.

Driven member 24 is thereafter free to rotate with respect to driving member 22 which may remain stationary as desired.

In order to remesh the teeth arrangement 50 into torque transmitting condition, the coupling must be manually removed and disassembled by an operator then reassembled and reinstalled as shown in FIG. 1. The feature of manual resetting of coupling 16 precludes the possibility of inadvertent reconnection of the coupling and possible resulting damage.

The foregoing description and drawing will suggest other embodiments and variations of structure to those skilled in the art, all of which are intended to be included in the spirit of the invention as set forth herein.

That being claimed is:

1. A protective torque transmitting rotary overspeed disconnect coupling comprising: a driving member, a driven member, bearing means rotatably mounting said driving member to said driven member for relative rotation about an axis, torque transfer means releasably connecting said driving member and said driven member in torque transmitting relation with each other, said torque transfer means comprising a torque driving member having teeth and extending from said driving member, a torque driven member having teeth and extending from said driven member, and a torque transfer member having teeth releasably meshing with said teeth of said driving member and said teeth of said driven member respectively when said torque transfer member is in a first position, said teeth being constructed and arranged to transmit torque between said driving and driven members in either angular sense about said axis, means mounting said torque transfer member for movement from said first position to a second position in which its teeth are out of mesh with the teeth of said torque driving member and the teeth of said torque driven member respectively, resilient means for moving said torque transfer member from said first position to said second position, rigid releasable support means responsive to centrifugal force for holding said torque transfer member in said first position and releasable responsive to centrifugal force of preselected magnitude for releasing said torque transfer member to permit it to be moved from said first position to said second position responsive to said resilient means, means for connecting said driving member to a rotatable drive shaft in alignment with said axis, and means for connecting said driven member to a driven shaft in alignment with said axis.

2. A protective coupling as defined in claim 1 wherein said means mounting said torque transfer member mounts said torque transfer member on said driven member, and said rigid releasable support means is carried by said driving member.

3. A protective coupling as defined in claim 2 wherein said support means comprises a first radial support plate on said torque transfer member, a second radial support plate on said driven member, a rigid support member received in compression between and abutting said support plates, said support member being movable radially outwardly from between said support plates responsive to centrifugal force for releasing said torque transfer member, and resilient means biasing said support member radially inwardly.

4. A protective coupling as defined in claim 1 including latch means for retaining said torque transfer member in said second position.

5. A protective coupling as defined in claim 1 wherein said teeth are of curvate configuration.

6. A protective coupling as defined in claim 1 wherein said bearing means provide radial and thrust support between said driving member and said driven member.

7. A protective coupling as defined in claim 1 wherein said drive shaft is driven by an electric motor and said driven shaft drives a centrifugal pump.

\* \* \* \* \*

PO-1050
(5/69)

UNITED STATES PATENT OFFICE
CERTIFICATE OF CORRECTION

Patent No. 3,779,354      Dated December 18, 1973

Inventor(s) Rowland E. Ball

It is certified that error appears in the above-identified patent and that said Letters Patent are hereby corrected as shown below:

Column 6, line 23 (Claim 2, line 5) cancel "driving" and insert --driven--.

Signed and sealed this 19th day of November 1974.

(SEAL)
Attest:

McCOY M. GIBSON JR.      C. MARSHALL DANN
Attesting Officer      Commissioner of Patents